United States Patent
Choi et al.

(10) Patent No.: US 9,411,075 B2
(45) Date of Patent: Aug. 9, 2016

(54) DISPLAY APPARATUS

(71) Applicant: SAMSUNG DISPLAY CO., LTD., Yongin, Gyeonggi-Do (KR)

(72) Inventors: Byeong-Hwa Choi, Yongin (KR); Seung-Bae Lee, Yongin (KR); Eun-Jung Lee, Yongin (KR); Hak-Sun Kim, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 281 days.

(21) Appl. No.: 14/269,415

(22) Filed: May 5, 2014

(65) Prior Publication Data

US 2015/0085384 A1 Mar. 26, 2015

(30) Foreign Application Priority Data

Sep. 24, 2013 (KR) .................. 10-2013-0113482

(51) Int. Cl.
*G02F 1/01* (2006.01)
*G02B 1/00* (2006.01)
*B82Y 20/00* (2011.01)
*G02B 5/00* (2006.01)

(52) U.S. Cl.
CPC ............... *G02B 1/007* (2013.01); *G02B 1/002* (2013.01); *B82Y 20/00* (2013.01); *G02B 5/003* (2013.01); *Y10S 977/742* (2013.01); *Y10S 977/773* (2013.01); *Y10S 977/78* (2013.01)

(58) Field of Classification Search
CPC ........ G02B 1/002; G02B 1/007; G02B 5/003; B82Y 15/00
See application file for complete search history.

(56) References Cited

U.S. PATENT DOCUMENTS

| 2008/0024792 | A1 | 1/2008 | Pendry et al. |
| 2009/0273662 | A1* | 11/2009 | Lucente ............ G02B 27/2214 348/43 |
| 2010/0232017 | A1 | 9/2010 | McCarthy et al. |
| 2012/0033283 | A1 | 2/2012 | Halsema |
| 2012/0326944 | A1 | 12/2012 | Choi et al. |

FOREIGN PATENT DOCUMENTS

| KR | 10-2011-0022681 A | 3/2011 |
| KR | 10-2013-0007690 A | 1/2013 |

OTHER PUBLICATIONS

J.B. Pendry, et al., "Controlling Electromagnetic Fields", Science, vol. 312, 1780 (2006), pp. 1780-1782.
Valdimir M. Shalaev, "Metamaterials: Technology of the Future", School of Electrical & Computer Engineering, Birck Nanotechnology Center, Purdue University.
Jeongwon Woo, "Quantum Metamaterials What is a Quantum Metamaterial?", Physics & High Technology, Mar. 2009.
"Superblack Material Absorbs Multiwavelengths of Light", Research & Technology, www.nasa.gov/goddard.
N. Reyren, et al., "Superconducting Interfaces Between Insulating Oxides", Science, vol. 317, (2007) pp. 1196-1199.

(Continued)

*Primary Examiner* — Joseph P Martinez
(74) *Attorney, Agent, or Firm* — Lee & Morse, P.C.

(57) ABSTRACT

A display apparatus including a display unit including at least one pixel area and a non-pixel area, the non-pixel area dividing the at least one pixel area; and a metamaterial structure that controls a path of light emitted from the at least one pixel area.

20 Claims, 6 Drawing Sheets

(56) References Cited

OTHER PUBLICATIONS

Vladimir M. Shalaev, "The Exciting Science of Light with Metamaterials", Purdue University, College of Engineering, Birck Nanotechnology Center.

"The More Than 99.9 Percent of Light 'Darkest Ever' Material Created", http://blog.joins.com/goldfarm/9196733, Kookmin News, reported by Changil Shin, Feb. 2008.

Wenshen Cai, et al.; Optical Cloaking with Metamaterials; Purdue University, Purdue e-Pubs; Birck and NCN Publications, Birck Nanotechnology Center; 2007, pp. 224-227.

* cited by examiner (A)

(B)

(A)

(B)

DISPLAY APPARATUS

CROSS-REFERENCE TO RELATED APPLICATION

Korean Patent Application No. 10-2013-0113482, filed on Sep. 24, 2013, in the Korean Intellectual Property Office, and entitled: "Display Apparatus," is incorporated by reference herein in its entirety.

BACKGROUND

1. Field

Embodiments relate to a display apparatus.

2. Description of the Related Art

Display apparatuses may include liquid crystal displays (LCDs), organic light-emitting devices (OLEDs) display apparatuses, and electrophoretic display apparatuses.

LCDs may display images by using electrical and optical properties of liquid crystal having anisotropy, such as a refractive index and permittivity. Each pixel may control a penetration ratio of light penetrating a polarizing plate by changing a liquid crystal array direction according to a data signal, thereby embodying gradations.

OLED display apparatuses may be spontaneous emission devices that allow organic light-emitting layers to emit light by the recombination of electrons and positive holes. A driving circuit of each pixel may control a current supplied to an OLED according to a data signal, thereby embodying gradations.

SUMMARY

Embodiments are directed to a display apparatus.

The embodiments may be realized by providing a display apparatus including a display unit including at least one pixel area and a non-pixel area, the non-pixel area dividing the at least one pixel area; and a metamaterial structure that controls a path of light emitted from the at least one pixel area.

The metamaterial structure may overlie a center of the at least one pixel area, the metamaterial structure having a width that is less than a width of the at least one pixel area.

The metamaterial structure may include a plurality of nanoparticles arranged in a dielectric.

The metamaterial structure may include a metamaterial layer in which a plurality of nanoholes are arranged, and the metamaterial layer may include at least one set of an alternately deposited insulating layer and metal layer.

The display apparatus may further include a first light absorption layer overlying the metamaterial structure, the first light absorption layer absorbing ambient light.

The first light absorption layer may include carbon nanotubes.

The display apparatus may further include a second light absorption layer overlying the non-pixel area, the second light absorption layer absorbing ambient light.

The display unit may include a plurality of pixel areas, the display apparatus further including a barrier between the plurality of pixel areas and individually dividing the plurality of pixel areas.

The metamaterial structure may redirect light emitted from the pixel area to be emitted outwardly at a region of the display apparatus overlying an edge of the pixel area.

The display apparatus may be one of an inorganic light-emitting display apparatus, an organic light-emitting display apparatus, or a liquid crystal display (LCD) apparatus.

The embodiments may be realized by providing a display apparatus including a display substrate; a display unit on the display substrate, the display unit including a plurality of pixel areas; a plurality of metamaterial structures overlying the plurality of pixel areas; a plurality of light absorption layers on the plurality of metamaterial structures; and an encapsulation substrate opposite to the display substrate.

The encapsulation substrate may fix at least one of the plurality of light absorption layers and the plurality of metamaterial structures.

The display apparatus may further include a barrier that individually divides the plurality of pixel areas.

The plurality of metamaterial structures may each include a first dielectric; and a second dielectric in the first dielectric, and a plurality of nanoparticles may be arranged in the first dielectric and may include a metal.

The second dielectric may have one of a cylindrical shape, a spherical shape, or a polyhedral shape.

The plurality of metamaterial structures may each include a metamaterial layer, the metamaterial layer including a plurality of nanoholes arranged therein, the metamaterial layer may include at least one set of an alternately deposited insulating layer and metal layer, the insulating layer may include hydrogen silsesquioxane, and the metal layer may include silver.

The display apparatus may further include a touch screen panel on an outer side of the encapsulation substrate.

The light absorption layers may include at least one of carbon or chromium.

A width of each light absorption layer may be identical to or less than a width of each metamaterial structure.

The display unit may include one of an inorganic light-emitting device (LED), an organic LED, and an LCD.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
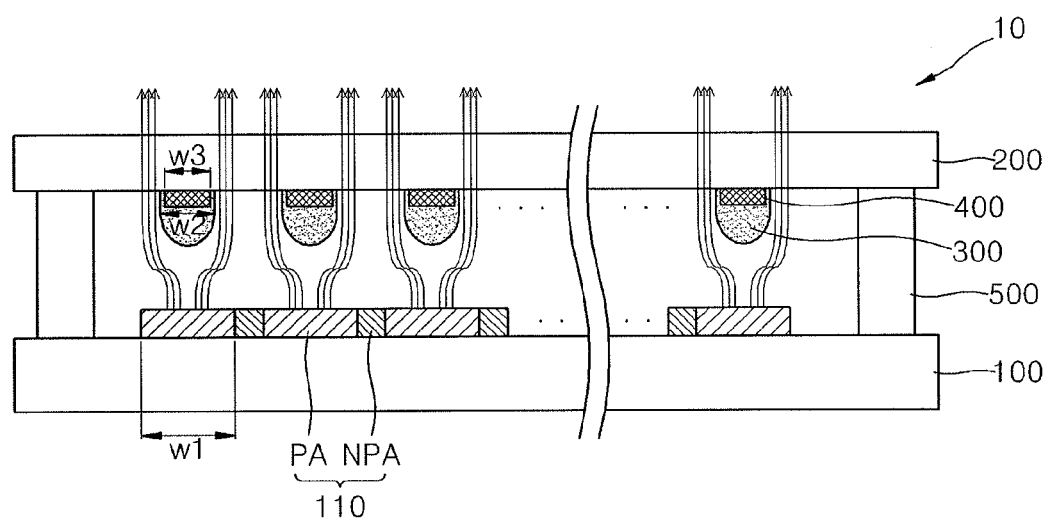
FIG. 1 illustrates a schematic cross-sectional view of a display apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

The terms "first" and "second' are not used to have limitative meanings but are used to distinguish one element from another.

Singular expressions, unless defined otherwise in contexts, include plural expressions.

In the following embodiments, it will be further understood that the terms "include," "comprise," and/or "have" used herein specify the presence of stated features or components, but do not preclude the presence or addition of one or more other features or components.

Also, it will be understood that when a layer, region, or component is referred to as being "formed on," another layer, region, or component, it can be directly or indirectly formed on the other layer, region, or component. For example, intervening layers, regions, or components may be present.

FIG. 1 illustrates a schematic cross-sectional view of a display apparatus 10 according to an embodiment.

Referring to FIG. 1, the display apparatus 10 may include a display unit 110. The display unit 110 may include at least one pixel area PA and a non-pixel area NPA. The non-pixel area NPA may divide the pixel area PA. The display apparatus 10 may also include a metamaterial structure 300. The metamaterial structure 300 may control or redirect a path of light that is emitted from the pixel area PA.

The display apparatus 10 may further include, e.g., a display substrate 100, an encapsulation substrate 200, a light absorption layer 400, and/or a sealing member 500.

As noted above, the metamaterial structure 300 may be provided to control the path of light.

Metamaterials designate or refer to an artificial structure that controls a phase of a wave function and transport properties at a nano-scale by spatially arranging or joining nanostructures, thereby embodying new quantum mechanical properties that are different from material properties of an individual nanostructure. Metamaterials may include, e.g., optical metamaterials, which may be embodied as an optical medium having a negative refractive index in which both permittivity $\epsilon$ and permeability $\mu$ are negative numbers ($\epsilon$<0 and $\mu$<0). According thereto, an optical cloaking phenomenon and focusing light over a diffraction limit may be available by using the optical metamaterials.

The metamaterial structure 300 may include metamaterials, and may control the path of light emitted from the pixel area PA. The metamaterial structure 300 may change a path of light that is emitted from a center of the pixel area PA to allow the light to be emitted from the display apparatus at a region corresponding with or overlying an edge of the pixel area PA. The metamaterial structure 300 may be disposed corresponding to or may overlie a center of the pixel area PA. A width w2 of the metamaterial structure 300 may be less than a width w1 of the pixel area PA. Accordingly, the light emitted from the pixel area PA may be refracted by the metamaterial structure 300 and may be redirected to a region overlying the edge of the pixel area PA. A degree of refraction may vary with properties of metamaterials, which may be controlled by design. For example, light emitted from a center of a pixel area PA may be redirected around a light absorption layer 400 by the metamaterial structure 300 (so as not to be absorbed by the light absorption layer 400). According thereto, the light emitted from the pixel area PA may be emitted outwardly without loss.

Detailed examples of the metamaterial structure 300 will be described below with reference to FIGS. 2A to 2C.

The display substrate 100 may be formed of one of a glass material, a plastic material, or a metallic material. The display substrate 100 may be a flexible substrate.

The display unit 110 may embody or display an image, and may be formed of or may include the pixel areas PA and the non-pixel area NPA (that divides the pixel areas PA). The display unit 110 may be formed on the display substrate 100, and may include various thin film transistors and capacitors. In an implementation, the display unit 110 may include a light-emitting device (LED) or a liquid crystal display (LCD). The LED may include, e.g., an inorganic LED (using an inorganic material) and/or an organic LED (using an organic material). In this case, the inorganic LED may be an LED whose light emission layer (that emits light by a current applied thereto) is formed of an inorganic material, e.g., a semiconductor, and the organic LED may be an LED whose light emission layer is formed of an organic material.

When the display unit 110 includes an LCD, an additional backlight unit (not shown) may be included.

The pixel area PA of the display unit 110 may be plural, e.g., the display unit 110 may include a plurality of pixel areas PA. In an implementation, each of a plurality of pixel areas PA may emit one color of red, green, blue, or white. In an implementation, all the plurality of pixel areas PA may emit a single color. In this case, a color filter layer (not shown) may be provided to embody a color to correspond to the plurality of pixel areas PA.

The encapsulation substrate 200 may be opposite to the display substrate 100. For example, the encapsulation substrate 200 may be parallel with and/or face the display substrate 100. The encapsulation substrate 200 may protect the display unit 110 from, e.g., outside moisture and air. The encapsulation substrate 200 may be a window provided on a top layer of the display apparatus 10. The encapsulation substrate 200 may include various materials. For example, the encapsulation substrate 200 may be formed of one of a glass material and various plastic materials such as acryl. In an implementation, a bottom surface or a top surface of the encapsulation substrate 200 may further include, e.g., a protective film, a touch screen panel, or a color filter layer (not shown).

The encapsulation substrate 200 may fix at least one of the metamaterial structure 300 and the light absorption layer 400. For example, at least one of the metamaterial structure 300 and the light absorption layer 400 may be on the encapsulation substrate 200. In an implementation, the light absorption layer 400 and/or the metamaterial structure 300 may be previously formed on and fixed to the encapsulation substrate 200, and then the encapsulation substrate 200 and the display substrate 100 may be combined, thereby manufacturing the display apparatus 10.

The light absorption layer 400 may absorb light incident into the display apparatus 10 from the outside, e.g., external light or ambient light. The light absorption layer 400 may be disposed corresponding to, may overlie, or may be aligned with the metamaterial structure 300. The light absorption layer 400 may have a size that is sufficiently small so as to avoid blocking light that is emitted from the pixel area PA and then has an optical path changed by the metamaterial structure 300. For example, the metamaterial structure 300 may redirect light from a center of a pixel area PA around the light absorption layer 400 so that such light is not absorbed by the light absorption layer 400, thereby improving efficiency by ensuring that light emitted from the pixel area PA is not lost.

In an implementation, a width w3 of the light absorption layer 400 may be less than the width w1 of the pixel area PA.

The light absorption layer 400 may include a material that absorbs visible rays. The light absorption layer 400 may include at least one of, e.g., a chromatic pigment, a black dye, or black color particles. In an implementation, the light absorption layer 400 may include, e.g., carbon nanotubes. In an implementation, the light absorption layer 400 may include, e.g., Cr, CrOx, CR/CrOx, Cr/CrOx/CrNy, a resin (such as a carbon pigment and an RGB-mixed pigment), or graphite.

The sealing member 500 may surround the display unit 110 and may join the display substrate 100 and the encapsulation substrate 200. The sealing member 500 may help protect the display unit 110 from outside moisture and air. The sealing member 500 may use, e.g., sealing, glass, or frit.

A moisture absorbent or absorber (not shown) may be further provided in an inner space (e.g., formed by the display substrate 100, the encapsulation substrate 200, and the sealing member 500) of the display apparatus 10. The moisture absorber may be on one side of the display unit 110. The moisture absorber may help prevent a decrease in the lifespan of an OLED, which may be caused by moisture and oxygen reacting with each other. The moisture absorber may include, e.g., one of alkali metallic oxides, alkali earth metallic oxides, metallic halides, lithium sulfates, metallic sulfates, metallic perchlorate, silica gel, phosphorous pentoxide, and/or a mixture thereof.

As described above, the display apparatus 10 may control the path of light by using the metamaterial structure 300, e.g., around the light absorption layer 400, thereby increasing light emission efficiency. Also, the display apparatus 10 may include the light absorption layer 400, and a reflection of outdoor or ambient light may be reduced and color definition and contrast may be increased. According to a configuration described above, a polarizing film may be omitted in the display apparatus 10, and thus light efficiency may be further improved because there may be no loss of light that would otherwise be caused by the polarizing film.

Hereinafter, examples of the metamaterial structure 300 will be described with reference to FIGS. 2A and 2B.

Figure 2A:
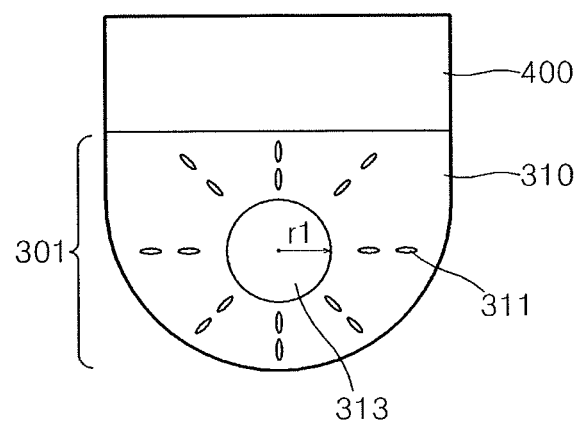
FIG. 2A illustrates an example of a metamaterial structure that is applicable to the embodiments.
Figure 2A:
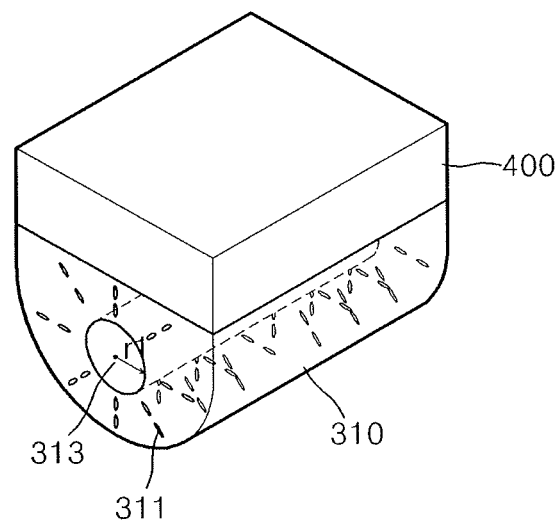

FIG. 2A illustrates a metamaterial structure 301 that is applicable to the embodiments. FIG. 2A (A) illustrates a cross-sectional view of the light absorption layer 400 and the metamaterial structure 301, and FIG. 2A (B) illustrates a perspective view of the light absorption layer 400 and the metamaterial structure 301.

Referring to FIG. 2A, a plurality of nanoparticles 311 may be arranged in a first dielectric 310 of the metamaterial structure 301.

The plurality of nanoparticles 311 may have a nano-sized diameter or length, and may have various shapes, e.g., a nanorod, a nano wire, an oval shape, or a spherical shape. The plurality of nanoparticles 311 may be regularly or irregularly arranged inside the first dielectric 310. A rate or number of the plurality of nanoparticles 311 in the first dielectric 310 may be changed according to design.

In an implementation, the plurality of nanoparticles 311 may be formed of or may include metal. For example, the plurality of nanoparticles 311 may be formed of or may include silver (Ag).

The first dielectric 310 may include a second dielectric 313. In an implementation, the second dielectric 313 may have a cylindrical shape having a radius r1. In an implementation, the second dielectric 313 may have various suitable shapes, e.g., a spherical shape or a polyhedral shape. The second dielectric 313 may have a permittivity that is identical to or different from that of the first dielectric 310. In an implementation, the permittivity of the second dielectric 313 may be less than that of the first dielectric 310. In an implementation, the second dielectric 313 may include air.

Parameters, e.g., the permittivity, shape, or size of the first dielectric 310 and the second dielectric 313 or the shape and size of the plurality of nanoparticles 311, may be variously changed according to properties of the metamaterial structure 301. The parameters may be provided through a shape-dependent effective-medium theory, finite-element simulations for effective parameters, and/or field-mapping simulations.

Figure 2B:
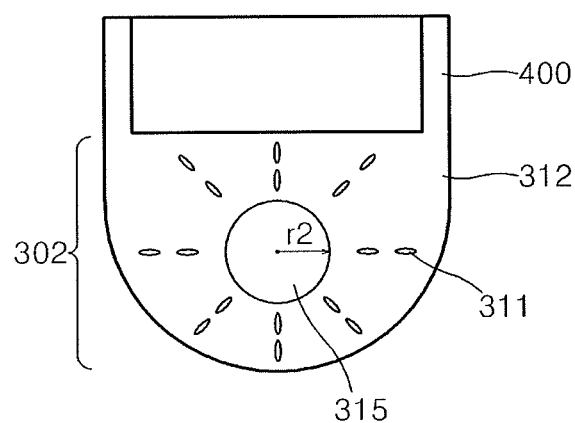
FIG. 2B illustrates another example of the metamaterial structure that is applicable to the embodiments.
Figure 2B:
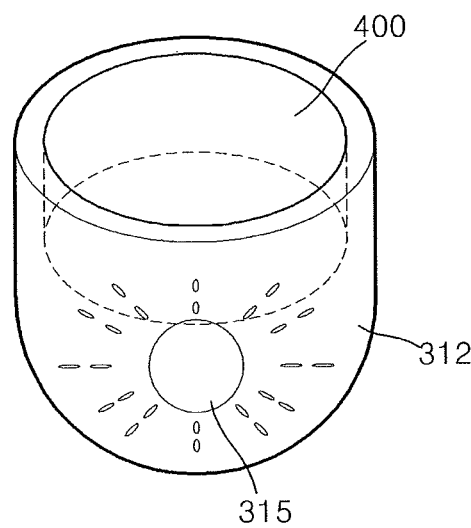

FIG. 2B illustrates another example of the metamaterial structure 300, that is applicable to embodiments. FIG. 2B (A) illustrates a cross-sectional view of the light absorption layer 400 and a metamaterial structure 302, and FIG. 2B (B) illustrates a perspective view of the light absorption layer 400 and the metamaterial structure 302.

Referring to FIG. 2B, comparing the metamaterial structure 302 of FIG. 2B with the metamaterial structure 301 of FIG. 2A, shapes of a first dielectric 312 and a second dielectric 315 may differ from those of the first dielectric 310 and the second dielectric 313.

The second dielectric 315 may have a spherical shape having a radius r2, and the first dielectric 312 may surround the second dielectric 315. The plurality of nanoparticles 311 may be arranged in the first dielectric 312. The second dielectric 315 may have a permittivity and a shape, which may be variously changed.

Figure 2C:
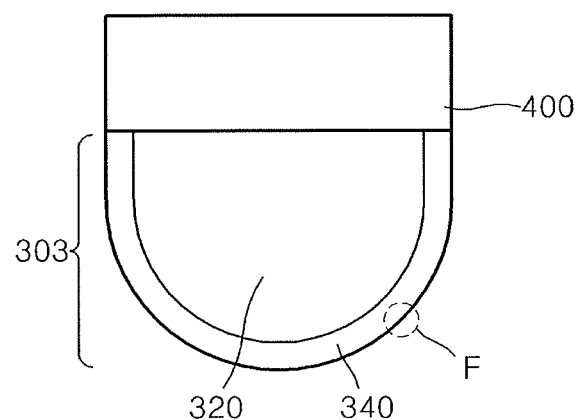
FIG. 2C illustrates still another example of the metamaterial structure that is applicable to the embodiments.
Figure 2C:
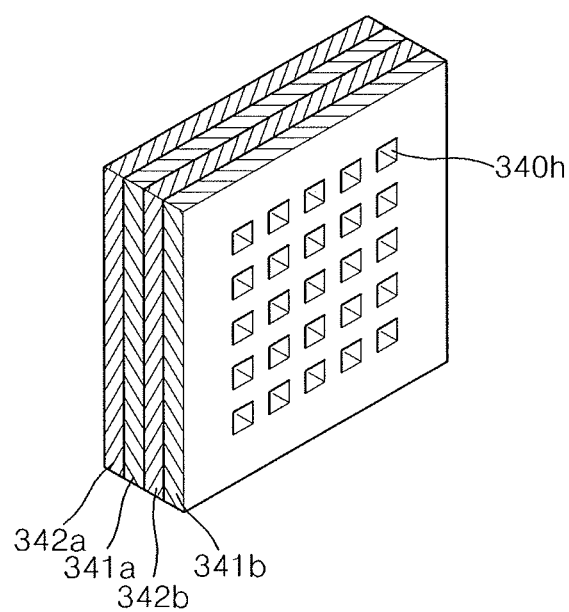

FIG. 2C illustrates still another example of the metamaterial structure 300, that is applicable to embodiments. FIG. 2C (A) illustrates a cross-sectional view of a metamaterial structure 303, and FIG. 2C (B) illustrates an enlarged perspective view of a region F of the metamaterial structure 303 of FIG. 2C (A).

Referring to FIG. 2C, the metamaterial structure 303 may include a metamaterial layer 340 in which a plurality of nanoholes 340h are arranged.

The metamaterial layer 340 may surround an inner dielectric 320, and may have a deposition structure formed of, e.g., two kinds of materials. The inner dielectric 320 may be omitted, if desired.

For example, the metamaterial layer 340 may include a structure in which a first insulating layer 342a, a first metal layer 341a, a second insulating layer 342b, and a second metal layer 341b are sequentially deposited. The metamaterial layer 340 may include an additional deposition structure. The metamaterial layer 340 may have a thickness of, e.g., about several ten nanometers to about several hundreds nanometers.

In an implementation, one of the first insulating layer 342a or the second insulating layer 342b may be formed of or may include, e.g., hydrogen silsesquioxane (HSQ), which is one kind of glass.

In an implementation, one of the first metal layer 341a or the second metal layer 341b may be formed of or may include silver (Ag).

The plurality of nanoholes 340h may penetrate the metamaterial layer 340. The plurality of nanoholes 340h may be regularly or irregularly arranged. The plurality of nanoholes 340h may have various shapes, e.g., a circular shape or a polygonal shape. A width or a diameter of the plurality of nanoholes 340h may be about several tens nanometers to about several hundreds nanometers.

A deposition structure and material of the metamaterial layer 340, and a size and shape of the plurality of nanoholes 340h, may be variously changed according to properties of the metamaterial structure 303.

The metamaterial structures 301, 302, and 303 described with reference to FIGS. 2A to 2C are exemplary. In an implementation, a suitable metamaterial structure having a negative refractive index may be applied to the embodiments.

Figure 3:
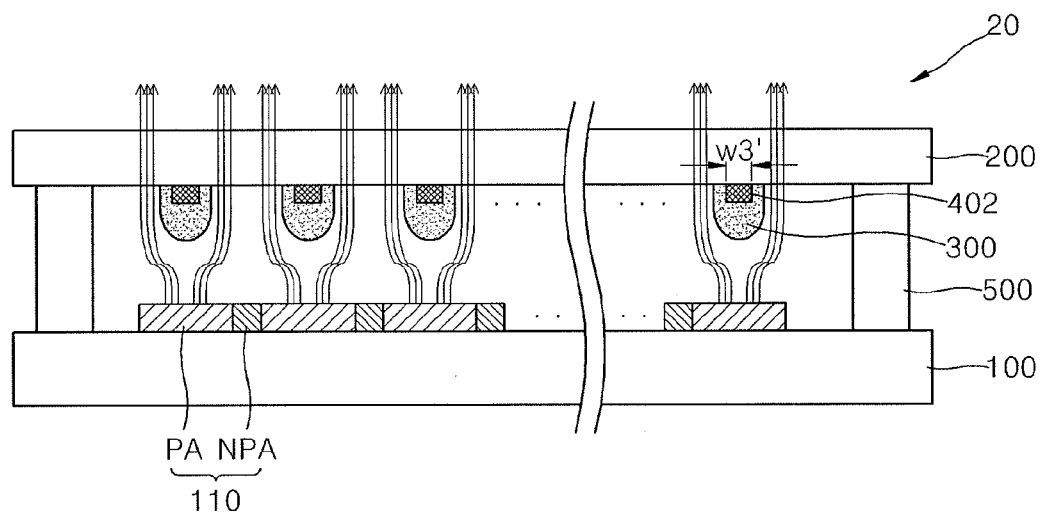
FIG. 3 illustrates a schematic cross-sectional view of a display apparatus according to another embodiment.

FIG. 3 illustrates a schematic cross-sectional view of a display apparatus 20 according to another embodiment. In FIG. 3, like reference numerals refer to like elements. In this case, a repeated description thereof may be omitted for brevity.

Referring to FIG. 3, the display apparatus 20 may have a difference in which a width w3' of a light absorption layer 402 may be less than the width w3 of the light absorption layer 400 of the display apparatus 10 of FIG. 2.

The width w3' of the light absorption layer 402 may be variously changed in order not to disturb or adversely affect a path of light that is emitted from the pixel area PA. For example, the width w3' of the light absorption layer 402 may be adjusted in such a way that the path of light, changed or redirected by the metamaterial structure 300, is not absorbed by the light absorption layer 402.

Figure 4:
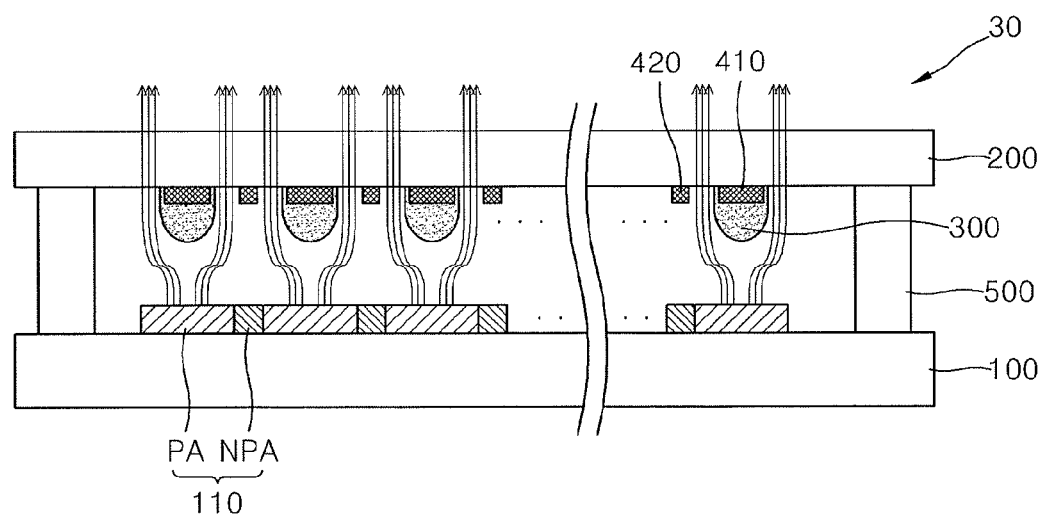
FIG. 4 illustrates a schematic cross-sectional view of a display apparatus according to still another embodiment.

FIG. 4 illustrates a schematic cross-sectional view of a display apparatus 30 according to still another embodiment. In FIG. 4, like reference numerals refer to like elements. In this case, a repeated description thereof may be omitted for brevity.

Referring to FIG. 4, comparing with the display apparatus 10, differently therefrom, the display apparatus 30 may include a first light absorption layer 410 and a second light absorption layer 420.

The first light absorption layer 410 may be disposed corresponding to or may overlie the metamaterial structure 300, and the second light absorption layer 420 may be disposed corresponding to or may overlie the non-pixel area NPA.

Light (that has a path that is changed or redirected by the metamaterial structure 300 to allow the light to be emitted outwardly) may be emitted between the first light absorption layer 410 and the second light absorption layer 420.

The first light absorption layer 410 and the second light absorption layer 420 may absorb light incident from the outside, e.g., ambient light. The first light absorption layer 410 and the second light absorption layer 420 may include a material for absorbing visible rays. The first light absorption layer 410 and the second light absorption layer 420 may include at least one of a chromatic pigment, a black dye, or black color particles. In an implementation, the first light absorption layer 410 and the second light absorption layer 420 may include, e.g., carbon nanotubes. In an implementation, the first light absorption layer 410 and the second light absorption layer 420 may include, e.g., Cr, CrOx, CR/CrOx, Cr/CrOx/CrNy, a resin (such as a carbon pigment or an RGB-mixed pigment), or graphite.

Figure 5:
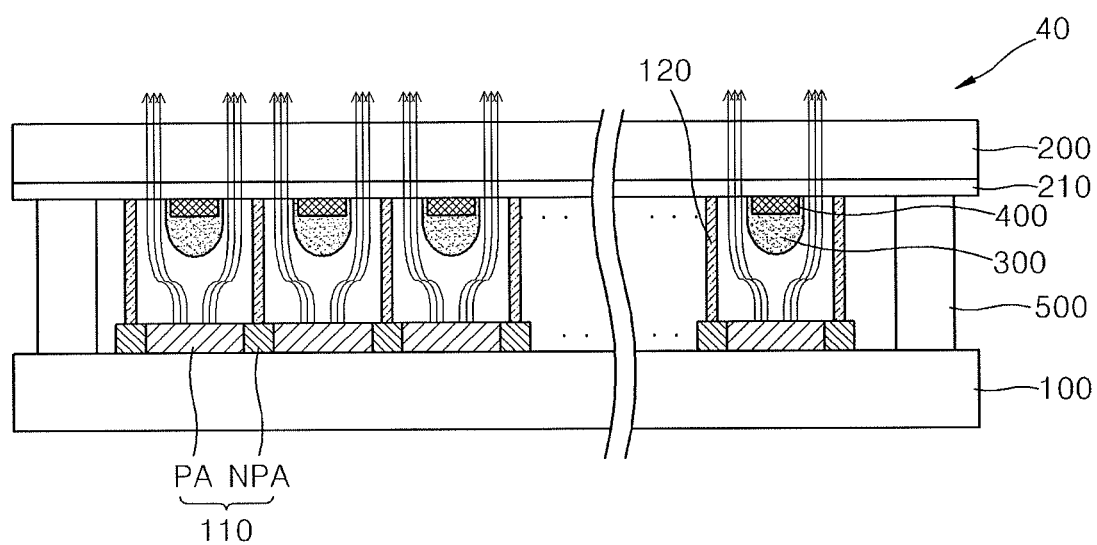
FIG. 5 illustrates a schematic cross-sectional view of a display apparatus according to still another embodiment.

FIG. 5 illustrates a schematic cross-sectional view of a display apparatus 40 according to another embodiment. In FIG. 5, like reference numerals refer to like elements. In this case, a repeated description thereof may be omitted for brevity.

Referring to FIG. 5, comparing with the display apparatus 10, the display apparatus 40 may further include a touch screen panel 210 and/or a barrier 120.

The touch screen panel 210 may be provided in order to recognize a location of a touch of a hand of a human or an object by converting the touch into an electric signal. The touch screen panel 210 may include a plurality of touch sensing structures for sensing a touch operation. The plurality of touch sensing structures may be formed of a patterned high conductive material.

The barrier 120 may be disposed on the non-pixel area NPA of the display unit 110, and may individually divide the plurality of pixel areas PA. The barrier 120 may surround the pixel area PA and may extend toward the encapsulation substrate 200.

The barrier 120 may divide light that is emitted from the respective pixel areas PA so as not to interfere one another. For example, the barrier 120 may help guide a path of light emitted from the pixel area PA to be emitted outwardly.

The described display apparatuses 10, 20, 30, and 40 may be applied to various display apparatuses, e.g., an organic light-emitting display apparatus, an organic light-emitting display apparatus, or an LCD apparatus.

By way of summation and review, in display apparatuses, in order to reduce a reflection of outdoor (e.g., ambient or external) light and to thereby improve visibility, various functional layers, e.g., polarizing films, may be applied. The various functional layers may cause a loss of light emitted from display apparatuses.

Against this backdrop, materials may be artificially manipulated by an atomic unit due to the development of nanotechnologies, and new material structures may be manufactured. New concept structures based on nanotechnologies may include, e.g., quantum dots, nano-lines, and ultra thin films. These may use a property in which quantum effects become noticeable at a nano-scale.

The embodiments may provide an organic light-emitting display apparatus employing metamaterials.

As described above, according to the one or more of the above embodiments, an organic light-emitting display apparatus may employ metamaterials, thereby increasing light efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:
   a display unit including at least one pixel area and a non-pixel area, the non-pixel area dividing the at least one pixel area; and
   a metamaterial structure that controls a path of light emitted from the at least one pixel area.

2. The display apparatus as claimed in claim 1, wherein the metamaterial structure overlies a center of the at least one pixel area, the metamaterial structure having a width that is less than a width of the at least one pixel area.

3. The display apparatus as claimed in claim 1, wherein the metamaterial structure includes a plurality of nanoparticles arranged in a dielectric.

4. The display apparatus as claimed in claim 1, wherein:
   the metamaterial structure includes a metamaterial layer in which a plurality of nanoholes are arranged, and
   the metamaterial layer includes at least one set of an alternately deposited insulating layer and metal layer.

5. The display apparatus as claimed in claim 1, further comprising a first light absorption layer overlying the metamaterial structure, the first light absorption layer absorbing ambient light.

6. The display apparatus as claimed in claim 5, wherein the first light absorption layer includes carbon nanotubes.

7. The display apparatus as claimed in claim 1, further comprising a second light absorption layer overlying the non-pixel area, the second light absorption layer absorbing ambient light.

8. The display apparatus as claimed in claim 1, wherein the display unit includes a plurality of pixel areas, the display apparatus further comprising a barrier between the plurality of pixel areas and individually dividing the plurality of pixel areas.

9. The display apparatus as claimed in claim 1, wherein the metamaterial structure redirects light emitted from the pixel area to be emitted outwardly at a region of the display apparatus overlying an edge of the pixel area.

10. The display apparatus as claimed in claim 1, wherein the display apparatus is one of an inorganic light-emitting display apparatus, an organic light-emitting display apparatus, or a liquid crystal display (LCD) apparatus.

11. A display apparatus, comprising:
a display substrate;
a display unit on the display substrate, the display unit including a plurality of pixel areas;
a plurality of metamaterial structures overlying the plurality of pixel areas;
a plurality of light absorption layers on the plurality of metamaterial structures; and
an encapsulation substrate opposite to the display substrate.

12. The display apparatus as claimed in claim 11, wherein the encapsulation substrate fixes at least one of the plurality of light absorption layers and the plurality of metamaterial structures.

13. The display apparatus as claimed in claim 11, further comprising a barrier that individually divides the plurality of pixel areas.

14. The display apparatus as claimed in claim 11, wherein:
the plurality of metamaterial structures each include:
a first dielectric; and
a second dielectric in the first dielectric, and
a plurality of nanoparticles are arranged in the first dielectric and include a metal.

15. The display apparatus as claimed in claim 14, wherein the second dielectric has one of a cylindrical shape, a spherical shape, or a polyhedral shape.

16. The display apparatus as claimed in claim 11, wherein:
the plurality of metamaterial structures each include a metamaterial layer, the metamaterial layer including a plurality of nanoholes arranged therein,
the metamaterial layer includes at least one set of an alternately deposited insulating layer and metal layer,
the insulating layer includes hydrogen silsesquioxane, and
the metal layer includes silver.

17. The display apparatus as claimed in claim 11, further comprising a touch screen panel on an outer side of the encapsulation substrate.

18. The display apparatus as claimed in claim 11, wherein the light absorption layers include at least one of carbon or chromium.

19. The display apparatus as claimed in claim 11, wherein a width of each light absorption layer is identical to or less than a width of each metamaterial structure.

20. The display apparatus as claimed in claim 11, wherein the display unit includes one of an inorganic light-emitting device (LED), an organic LED, and an LCD.

* * * * *